United States Patent
Albrecht

(10) Patent No.: US 6,902,074 B2
(45) Date of Patent: Jun. 7, 2005

(54) SUPPORT STAND

(75) Inventor: Ernest W. Albrecht, Middleburg, FL (US)

(73) Assignee: Caitec Corporation, Baltimore, MD (US)

(*) Notice: Subject to any disclaimer, the term of this patent is extended or adjusted under 35 U.S.C. 154(b) by 7 days.

(21) Appl. No.: 10/458,725

(22) Filed: Jun. 11, 2003

(65) Prior Publication Data

US 2004/0089772 A1 May 13, 2004

Related U.S. Application Data

(60) Provisional application No. 60/387,387, filed on Jun. 11, 2002.

(51) Int. Cl.$^7$ ............................................. A47B 47/00
(52) U.S. Cl. ..................... 211/189; 211/182; 312/257.1
(58) Field of Search ................................. 211/182, 189, 211/194, 186; 312/257.1; D30/101; 248/127, 165; 108/186, 180, 153.1, 155, 159

(56) References Cited

U.S. PATENT DOCUMENTS

| | | | | |
|---|---|---|---|---|
| 4,673,092 A | * | 6/1987 | Lamson et al. | 211/188 |
| 4,703,702 A | * | 11/1987 | Speicher | 108/56.3 |
| 4,757,769 A | * | 7/1988 | Suttles | 108/190 |
| 4,773,547 A | * | 9/1988 | Bell | 211/194 |
| 5,016,765 A | * | 5/1991 | Leonardo | 211/189 |
| 5,190,171 A | * | 3/1993 | Christman, Jr. | 211/188 |
| 5,579,703 A | * | 12/1996 | King | 108/186 |
| 5,711,429 A | * | 1/1998 | Brown | 211/41.14 |
| 6,036,034 A | * | 3/2000 | Battaglia et al. | 211/187 |
| 6,279,763 B1 | * | 8/2001 | Bush | 211/195 |
| 6,488,160 B2 | * | 12/2002 | Wang | 211/195 |
| 6,726,041 B2 | * | 4/2004 | Dunn | 211/194 |

* cited by examiner

Primary Examiner—Jennifer E. Novosad
(74) Attorney, Agent, or Firm—Jones, Tullar & Cooper, P.C.

(57) ABSTRACT

A knock-down type support stand especially suited for aquariums or other heavy objects employs double walled support legs that are each formed of inner and outer sleeves of tubing. Upper and a lower horizontal frames act as supports for the objects. Attached to each outside corner of both of the frames is a corresponding one of a plurality of vertical hollow sleeves, each of which is of the same cross sectional dimension as the outer hollow sleeves in the support legs. The inner sleeves for each of the support legs are inserted into the vertical hollow sleeves in the frames, while the outer hollow sleeves for the support legs engage the top ends of the vertical hollow sleeves on the lower frame and the bottom ends of the vertical hollow sleeves on the upper frame. The stand preferably uses tight, friction fit tolerances.

11 Claims, 3 Drawing Sheets

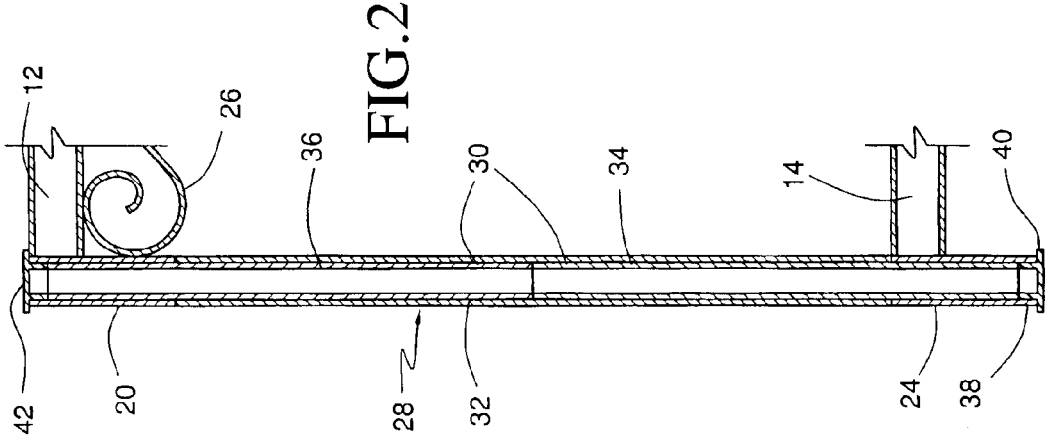
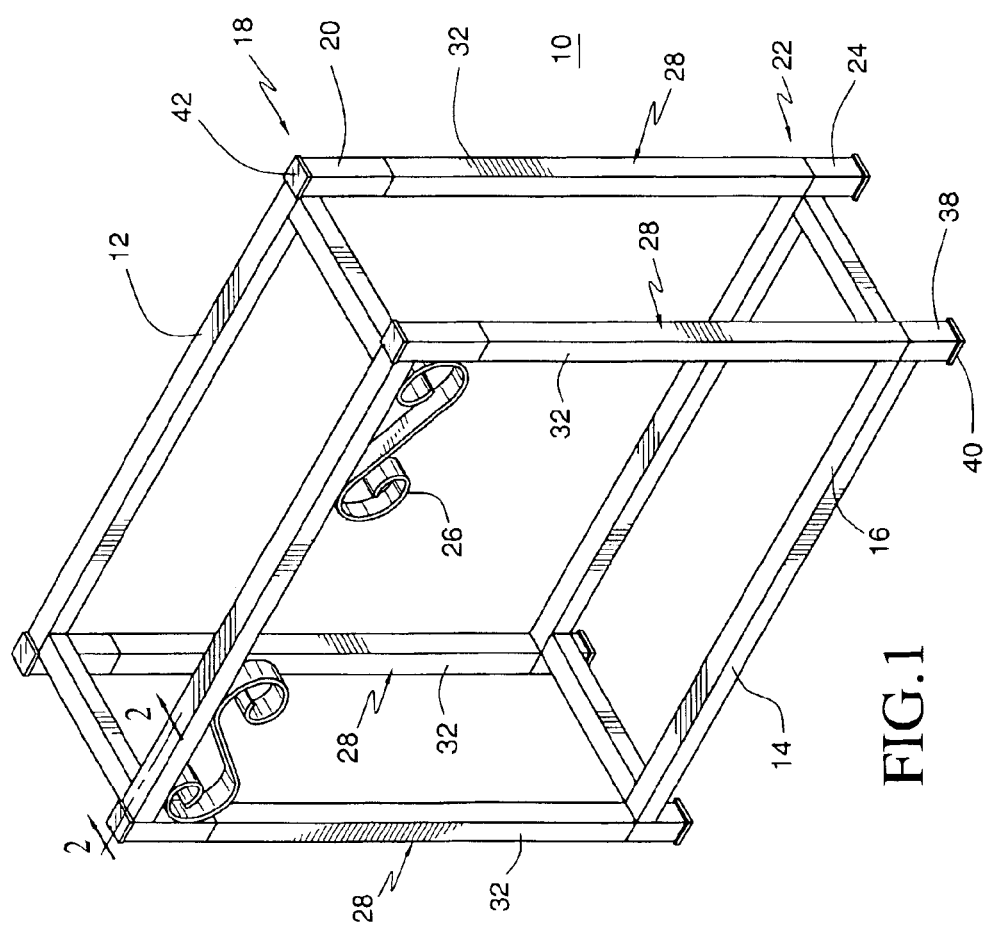

US 6,902,074 B2

SUPPORT STAND

CROSS REFERENCE TO RELATED APPLICATIONS

This application claims the benefit, under 35 U.S.C. 119(e), of U.S. Provisional Application No. 60/387,387, filed Jun. 11, 2002, which is hereby incorporated by reference in its entirety.

BACKGROUND OF THE INVENTION

1. Field of the Invention

The present invention relates, in general, to a support stand that is particularly suited for supporting heavy objects, such as aquariums, for example.

2. Description of the Prior Art

Large aquariums and other heavy objects require specially designed support stands for safely supporting the heavy loads. For example, a popular sized aquarium holds 55 gallons of water, which itself weighs in excess of 450 lbs. The support stand must therefore be of heavy-duty construction to provide adequate support. The most familiar type of stand for this application is a pre-assembled stand that is formed of metal tubes or plates that are welded together. While such a design is typically of sturdy construction, a substantial drawback is that the stands are costly to ship because of their large shipping volumes. A second known type of stand, refered to as a knockdown stand, is shipped in a compact, disassembled condition, which overcomes the shipping cost problem. However, knockdown stands are problematic for other reasons. In particular, these stands typically require time consuming and tedious assembly using tools with screws, bolts, nuts or other fasteners. In addition, the fact that the stands are held together by fasteners instead of by welds inherently results in a stand of less sturdy construction, especially if the fasteners are not properly secured.

In view of the foregoing, there is a need for a support stand that can be shipped in a disassembled condition, but can be quickly and easily assembled with a resulting sturdy construction.

SUMMARY OF THE INVENTION

The present invention fulfills the foregoing need and overcomes the drawbacks of previous support stand designs through provision of a knock-down type stand that requires no fasteners for assembly, yet is sturdy and rugged enough to support heavy objects, such as large aquariums. A key feature of the support stand that enhances its sturdiness is the provision of support legs that are each formed from double tubing in which one or more inner hollow sleeves are positioned within an outer hollow sleeve, preferably with a friction fit, but can be slid relative to the outer sleeve. The support stand also includes an upper and a lower horizontal frame, each of which is also preferably formed from lengths of tubing. Attached to each outside corner of both of the frames is a corresponding one of a plurality of vertical hollow sleeves. Each of the sleeves is of the same cross sectional dimension as the outer hollow sleeves in the support legs to faciliate reception of the ends of the inner sleeves, which are longer than the outer sleeves of the support legs for this reason.

To assemble the support stand, the lower frame is placed on a floor or other horizontal support surface, with the vertical hollow sleeves acting as support legs. Next, the inner sleeves for each of the support legs are inserted into the vertical hollow sleeves until they also abut the floor or support surface. The support leg outer hollow sleeves are then slid over the inner sleeves until the outer hollow sleeves abut the top ends of the lower frame's vertical hollow sleeves. Finally, the upper frame is mounted on the top ends of the inner hollow sleeves with its vertical hollow sleeves abutting the top ends of the support leg outer hollow sleeves. Thus, no fasteners are needed to assemble the support stand, yet the stand is very sturdy by virtue of the double walled construction of the support legs in which the inner sleeves run the full lengths of the legs and the frame hollow sleeves.

BRIEF DESCRIPTION OF THE DRAWINGS

The features and advantages of the present invention will become apparent from the following detailed description of a preferred embodiment thereof, taken in conjunction with the accompanying drawings, in which:

FIG. 1 is a perspective view of an assembled support stand constructed in accordance with the preferred embodiment;

FIG. 2 is a partial cutaway front elevation taken along the line 2—2 of FIG. 1;

DETAILED DESCRIPTION OF THE PREFERRED EMBODIMENT

Figure 3:
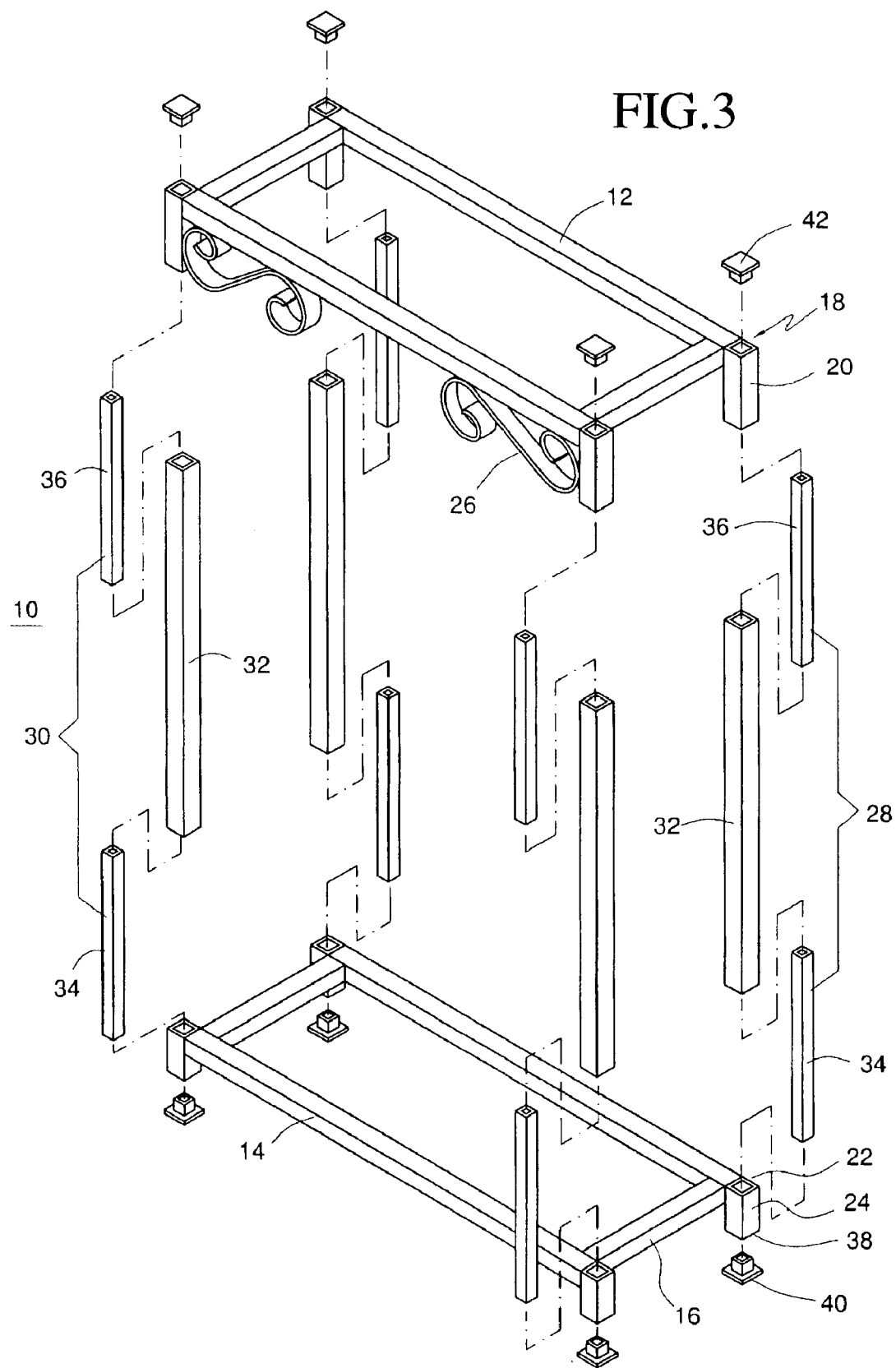
FIG. 3 is an exploded perspective view of the support stand of FIG. 1 showing the elements that make up the support stand.

With reference to FIGS. 1 and 2, a support stand 10 is illustrated that is formed from a number of individual elements that can be easily disassembled for compact stroage or shipping and then reassembled without the use of tools or fasteners. Preferably, the various elements of the stand 10 are formed from sections of hollow metal tubing, such as steel, to provide strength for supporting aquariums and other heavy objects. Alternatively, other metals, such as aluminum or plastics and other synthetic materials could be used where load requirements for the stand are less. The elements of the stand 10 include an upper rectangular support frame 12 and a lower rectangular support frame 14, each of which is preferably positioned horizontally to facilitate support of heavy objects, such as aquariums. The frames 12 and 14 are each preferably formed of a plurality of sections 16 of hollow tubing that are welded together. In addition, welded or otherwise attached outside each of the four corners 18 of the upper frame 12 is a corresponding one of a first plurality of vertical hollow sleeves 20. Similarly, welded or otherwise attached outside each of the four corners 22 of the lower frame 14 is a corresponding one of a second plurality of vertical hollow sleeves 24. The upper support frame 12 also includes optional nonfunctional ornamentation 26.

A key feature of the support stand that enhances its sturdiness is the provision of a group of four support legs 28 that are each formed from double tubing in which an inner hollow sleeve 30 is positioned within an outer hollow sleeve 32, preferably with a friction fit, but can be slid relative to the outer sleeve 32. For example, in one exemplary embodiment, the outer sleeves 32 are formed of 18 gauge ⅞" outer diameter square metal tubing while the inner sleeves 30 are formed from 16 gauge ¾" outer diameter metal tubing. The use of a friction fit is preferred to enhance sturdiness of the stand 10. The inner sleeve 30 is shown as being formed from first and second sections 34 and 36 to reduce packaging size requirements, but could also be formed from a single section of hollow tubing. The outer sleeve 32 is selected to have the same section width as that of the vertical hollow sleeves 20 and 24 on the upper and lower frames 12 and 14, respectively. To facilitate insertion in both of the hollow sleeves 20 and 24 and in the outer sleeve 32, the inner sleeve 30 has a length (or sections 34 and 36 have a combined length) that is longer than the length of the outer sleeve 32.

As illustrated, the lower frame 14 is employed as a base in which the lower ends 38 of the vertical sleeves 24 rest on a floor or other horizontal support surface. As an option, a plurality of casters or glides 40 can be inserted into the lower ends 38 of the sleeves 24 to facilitate ease of movement of the stand 10. To assemble the stand 10, the inner sleeve sections 34 of the support legs 28 are inserted into the vertical hollow sleeves 24 of the lower frame 14 until they contact the floor or other support surface. Next, the outer sleeves 32 of the support legs 28 are slid over the inner sleeve sections 34 until they abut the top ends of the lower frame vertical sleeves 24. The second group of inner sleeve sections 36 are next slid into the outer sleeves 32 until they engage the top ends of the first group of inner sleeve sections 34. Finally, the upper frame 12 is mounted in the exposed upper ends of the inner sleeve sections 36 so that the vertical hollow sleeves 20 engage the top ends of the support leg outer sleeves 32. A corresponding one of a plurality of plastic caps or the like 42 is then preferably inserted into each of the open top ends of the vertical sleeves 20 on the upper frame 12.

Figure 4:
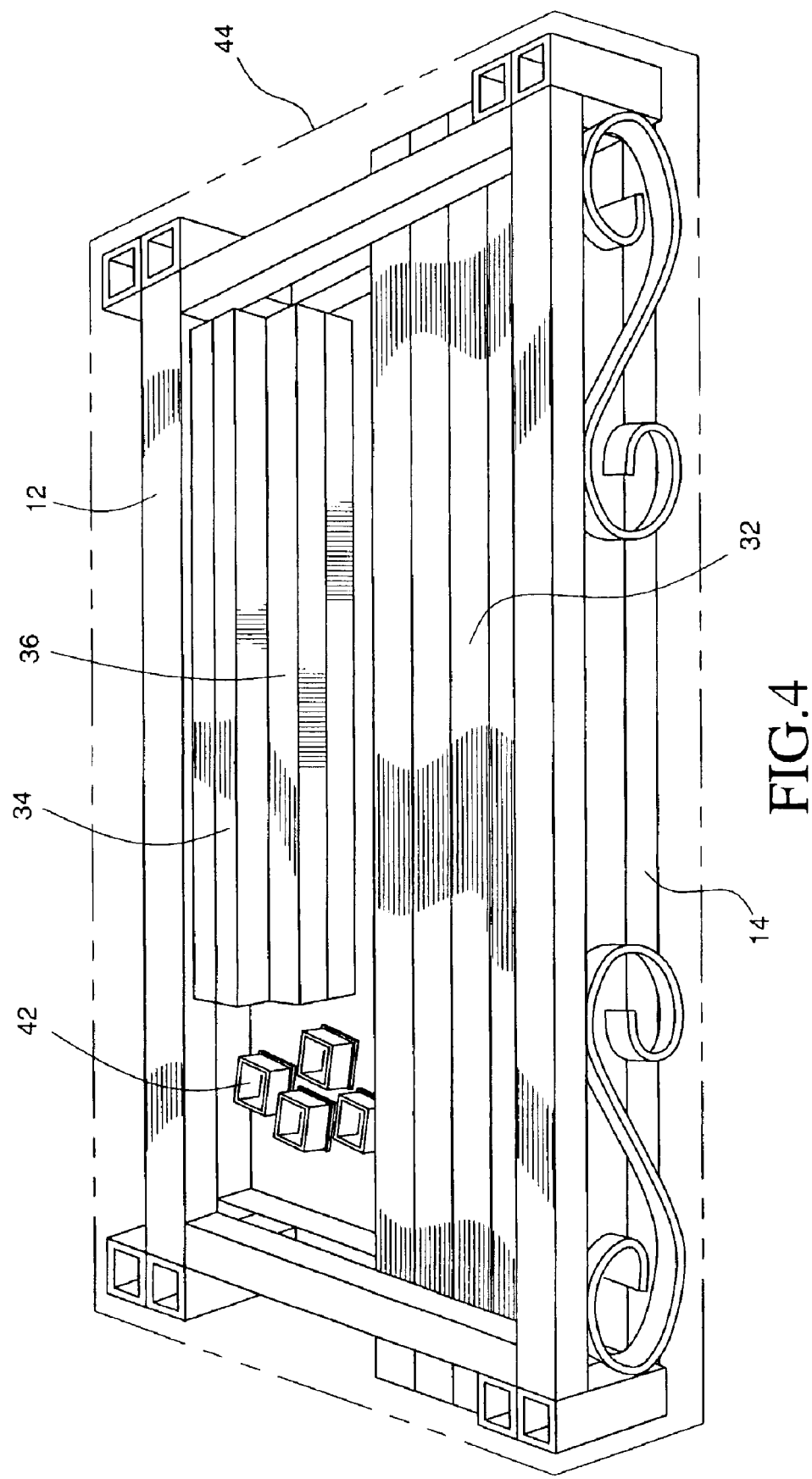
FIG. 4 is a perspective illustration showing the stand in its completely disassembled form ready for packaging and shipping.

The resulting structure is very sturdy by virtue of the double tube design. Use of square or rectangular tubing for the various sleeves is preferred because it prevents lateral wiggle in either side to side or front to back, as well as twist, which is an important factor when large tanks of water, e.g., aquariums, are supported by the stand. The support leg outer sleeves 32 are forced to align themselves perfectly with the same size tube used to make the sleeves 20 and 24 in the upper and lower frames 12 and 14 for both cosmetic and load bearing capability. The larger the vertical load, the more the inner tube is forced against the inner wall of the outer tube. Because the receiving sleeves 20 and 24 are on the outside corners 18 and 22 of the frames 12 and 14, respectively, aquariums or other objects of the same size can be supported both on the upper and lower frames 12 and 14 of the stand 10. The modular design also facilitates stacking of additional legs and frames to allow use as a book shelf or display shelf for example. Further, the design of the stand 10 allows the stand elements to be packed and shipped in a box only as tall as the sleeves 20 and 24 of each of the frames 12 and 14, which interlock inside each other (one up and one down). This packaging arrangement is illustrated in FIG. 4 in which the various elements of the stand 10 are shown arranged within a box or other container 44.

The applications of the support stand are numerous. Although specifically designed to support heavy objects, such as aquariums, the support stand can obviously be employed to support any types of objects, such as televisions, appliances, books or any other objects suitable for placement on shelves.

Although the invention has been disclosed in terms of a preferred embodiment and variations thereon, it will be understood that numerous modifications and variations could be made thereto without departing from the scope of the invention as defined in the following claims. For example, while the use of square or rectangular cross-sectional tubing is preferred to reduce twist or wiggle of the stand, tubing having other cross sectional shapes could also be employed. In addition, various other shapes of support stands, with any number of legs could be designed that incorporate the inventive inner/outer sleeve construction.

What is claimed is:

1. A support stand comprising:
   a) an upper and a lower support frame;
   b) a first plurality of hollow sleeves attached at spaced locations to said lower frame for supporting said lower frame;
   c) a second plurality of hollow sleeves attached at spaced locations to said upper frame; and,
   d) a plurality of support legs for supporting said upper frame at a position spaced above said lower frame, each of said legs including:
      1) an outer sleeve having a bottom end, a top end and a length; and
      2) an inner sleeve having a bottom end, a top end and a length that is longer than said length of said outer sleeve, said inner sleeve being frictionally fit within said outer sleeve and being slidable relative to said outer sleeve;
   wherein, said inner sleeve has a cross sectional diameter that facilitates insertion of said inner sleeve at said bottom end into a corresponding one of said plurality of hollow sleeves attached to said lower frame and at said top end into a corresponding one of said plurality of hollow sleeves attached to said upper frame; and, said outer sleeve has a diameter that facilitates engagement at said bottom end with a corresponding one of said plurality of hollow sleeves attached to said lower frame and supporting engagement at said top end with a corresponding one of said plurality of hollow sleeves attached to said upper frame.

2. The support stand of claim 1, wherein said upper and lower frames are placed in a horizontal position for supporting one or more objects, and said hollow sleeves and said support legs are placed in a vertical position for supporting said upper and lower frames.

3. The support stand of claim 2, wherein said each of said hollow sleeves in said first and second pluralities of hollow sleeves is disposed outside a corresponding one of a plurality of corners in said frames.

4. The support stand of claim 3, wherein each of said frames is rectangular and there are four each of said hollow sleeves and said support legs.

5. The support stand of claim 1, wherein each of said frames, hollow sleeves and support legs is made from a material selected from the group comprising metal, plastic or synthetic material.

6. The support stand of claim 1, wherein each of said sleeves has a rectangular shaped cross section.

7. The support stand of claim 1, wherein each of said inner sleeves of said legs is formed from multiple sections.

8. A support stand comprising:
   a) an upper and a lower horizontal support frame, each of said frames including a plurality of outside corners;
   b) a first plurality of hollow sleeves formed of rectangular cross section tubing attached one each to a corresponding one of said corners of said lower frame for supporting said lower frame;
   c) a second plurality of hollow sleeves formed of rectangular cross section tubing attached one each to a corresponding one of said corners of said upper frame; and, d) a plurality of support legs for supporting said upper frame at a position spaced above said lower frame, each of said legs including:
1) an outer sleeve formed of rectangular cross section tubing and having a bottom end, a top end and a length; and
2) an inner sleeve formed of rectangular cross section tubing and having a bottom end, a top end and a length that is longer than said length of said outer sleeve, said inner sleeve being frictionally fit within said outer sleeve and being slidable relative to said outer sleeve;

wherein, said inner sleeve has a cross sectional diameter that facilitates insertion of said inner sleeve at said bottom end into a corresponding one of said plurality of hollow sleeves attached to said lower frame and at said top end into a corresponding one of said plurality of hollow sleeves attached to said upper frame; and, said outer sleeve has a diameter that facilitates engagement at said bottom end with a corresponding one of said plurality of hollow sleeves attached to said lower frame and supporting engagement at said top end with a corresponding one of said plurality of hollow sleeves attached to said upper frame.

9. The support stand of claim 8, wherein each of said frames is rectangular and there are four each of said hollow sleeves and said support legs.

10. The support stand of claim 8, wherein each of said frames, hollow sleeves and support legs is made from a material selected from the group comprising metal, plastic or synthetic material.

11. The support stand of claim 8, wherein each of said inner sleeves of said legs is formed from multiple sections.

* * * * *